(12) United States Patent
Burns

(10) Patent No.: US 7,261,265 B2
(45) Date of Patent: Aug. 28, 2007

(54) SYSTEM FOR MOUNTING A FLAT PANEL DISPLAY

(75) Inventor: Don R. Burns, Tustin Ranch, CA (US)

(73) Assignee: Vantage Point Products Corp., Santa Fe Springs, CA (US)

( * ) Notice: Subject to any disclaimer, the term of this patent is extended or adjusted under 35 U.S.C. 154(b) by 0 days.

(21) Appl. No.: 10/600,682

(22) Filed: Jun. 20, 2003

(65) Prior Publication Data

US 2004/0256526 A1    Dec. 23, 2004

(51) Int. Cl.
*E04G 3/00* (2006.01)
(52) U.S. Cl. .................. 248/276.1; 248/274.1
(58) Field of Classification Search .......... 248/200, 248/324, 276.1, 917, 278.1, 919, 282.1, 920, 248/284.1, 921, 288.11, 288.31, 922, 923, 248/274.1, 289.11, 122.1, 918, 281.11; 16/221, 16/250; 361/681, 682; 348/825, 831
See application file for complete search history.

(56) References Cited

U.S. PATENT DOCUMENTS

| | | | | |
|---|---|---|---|---|
| 1,476,758 A | * | 12/1923 | La Hodny | 248/485 |
| 2,621,882 A | * | 12/1952 | Fletcher | 248/282.1 |
| 3,096,061 A | * | 7/1963 | Bertell | 248/481 |
| 3,433,444 A | * | 3/1969 | Smith | 248/279.1 |
| 3,889,908 A | * | 6/1975 | Larson | 248/515 |
| 4,159,092 A | * | 6/1979 | DeLano | 248/276.1 |
| 5,071,279 A | * | 12/1991 | Rutstrom | 403/90 |
| 5,092,552 A | * | 3/1992 | Dayton et al. | 248/280.11 |
| 5,845,885 A | * | 12/1998 | Carnevali | 248/181.1 |
| 6,367,756 B1 | * | 4/2002 | Wang | 248/278.1 |
| 6,484,994 B2 | * | 11/2002 | Hokugoh | 248/371 |
| 2005/0006542 A1 | * | 1/2005 | Henning et al. | 248/274.1 |

OTHER PUBLICATIONS

SPACEDEC® Swing Arm Installation Manual, Aug. 2001.
ERGOTRON® ARMS™ 100 Series product sheet, May 1999.
VIEWMASTER Compact LCD Arm User's Guide, Aug. 2001.
VIEWMASTER Adjustable LCD Arm User's Guide, Aug. 2001.
National Products, Inc. RAM MOUNT specifications, 3 pages, dated Jan. 2001 through Apr. 2001.
National Products, Inc. RAM Systems Catalog, pp. 12-13, Apr. 2001.
OMNIMOUNT® Visual Display™ Series Specification list (undated).

* cited by examiner

*Primary Examiner*—A. Joseph Wujciak, III
(74) *Attorney, Agent, or Firm*—Fulbright & Jaworski LLP

(57) ABSTRACT

A system for mounting a flat panel display. A mounting plate includes a first surface portion. A support arm includes an outward extending radial flange at a first end which abuts the first surface portion of the mounting plate. A cover includes an aperture and is affixed to the mounting plate such that the radial flange is disposed between the cover and the mounting plate with a second end of the support arm extending through the aperture. A flat panel display bracket is affixed to the second end of the support arm. The support arm may optionally be an articulating arm.

4 Claims, 10 Drawing Sheets

20

SYSTEM FOR MOUNTING A FLAT PANEL DISPLAY

BACKGROUND OF THE INVENTION

1. Field of the Invention

The field of the present invention is mounting systems for flat panel displays, in particular systems adapted for mounting flat panel displays to walls, desks, under cabinets, and other supporting structures.

2. Background

Many different types of systems exist for mounting flat panel displays to various structures, including racks, desktops, under cabinets, walls, poles, or other suitably supportive structures. One problem that frequently arises with such systems occurs during installation of a system mounted on a vertical surface. For an arm that is intended to articulate horizontally, a non-level installation, resulting in a non-level plane of articulation, causes undesirable vertical drift in the display position when the arm is articulated between opposite extremes. Non-level articulation may also cause unwanted movement of the display due to gravity when there is minimal resistance in the pivoting joints of the articulating arm. Further, non-level articulation may serve to add gravity-related stresses the articulating arm was not designed to bear, thus potentially shortening the overall life span of the system. For an arm that is intended to articulate vertically, deviance from the vertical causes undesirable horizontal drift in the display position when the arm is articulated between opposite extremes.

A second problem with many available systems is that they lack the versatility to be used for vertical and horizontal articulating applications without significant configuration changes. For example, some vertical articulating arms include tensioning springs to offset the force of gravity. The tensioning springs are attached between the mounting base structure and the articulating arm, and the mounting base structure is generally affixable to horizontal or vertical surfaces. The attachment points of the tensioning springs are positioned to provide the force necessary to offset gravity given the relative orientation between the base structure and the articulating arm when the system is affixed to either a horizontal or vertical surface. The attachment points, however, are generally not the same for both articulation orientations. Therefore, once most systems are installed, they can not be transformed from vertical articulation to horizontal articulation, or vice versa, without uninstalling, reconfiguring, and reinstalling the system.

Moreover, systems designed for horizontal articulation often include no mechanism capable of offsetting the force of gravity if installed to provide vertical articulation. Thus such systems are rendered useless for applications requiring vertical articulation, as they could not support the display at any but the lowest elevation.

SUMMARY OF THE INVENTION

The present invention is directed towards a mounting system for a flat panel display. The system comprises a mounting plate which is mountable to a supporting structure. A support arm is partially sandwiched between the mounting plate and a cover and extends outward from the supporting structure. A flat panel display bracket is affixed to the outward extending support arm.

In a first separate aspect of the present invention, the mounting plate includes a first surface portion and a first end of the support arm includes an outward extending radial flange, the radial flange abutting the first surface portion of the mounting plate. The cover includes an aperture and is affixed to the mounting plate such that the radial flange is disposed between the cover and the mounting plate with the second end of the support arm extending through the aperture. The flat panel display bracket is rotatably affixed to the second end of the support arm.

In a second separate aspect of the present invention, the support arm of the first aspect is rotatable relative to the mounting plate. The axis about which the support arm rotates is defined by the radial flange. The mounting plate and the cover are adapted to exert axial pressure on the radial flange. The axial pressure may be adjusted to increase or decrease the rotational freedom of the support arm as desired.

In a third separate aspect of the present invention, the support arm comprises an articulating arm including at least two arm segments connected at a joint. The joint is preferably adapted to provide adjustable resistance to rotation between the two arm segments.

In a fourth separate aspect of the present invention, any of the foregoing aspects may be employed in combination.

Accordingly, it is an object of the present invention to provide an improved mounting system for a flat panel display. Other objects and advantages will appear hereinafter.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
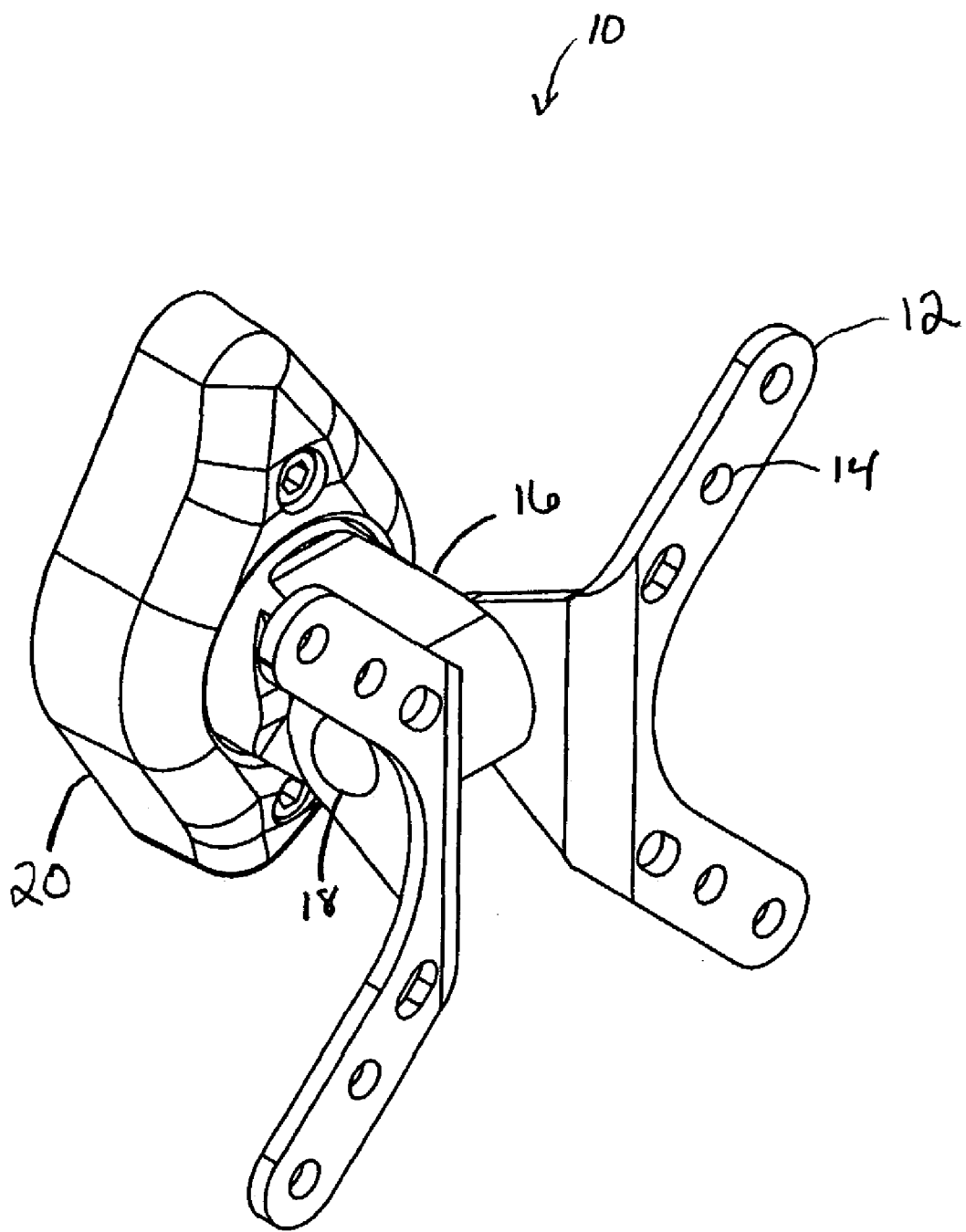
FIG. 1 illustrates a perspective view of a mounting system in accordance with a first embodiment of the present invention.

Turning in detail to the drawings, FIG. 1 illustrates a mounting system 10 which includes a flat panel display bracket 12 rotatably affixed to a support arm 16 by axle pin assembly 18. The display bracket 12 includes a plurality of mounting holes 14 for attaching a flat panel display (not shown). The holes 14 are arranged in an industry standard configuration so that flat panel displays from a multitude of manufacturers may be affixed to the display bracket 12. The holes 14 in the display bracket 12 are arranged according to the standard published by the Video Electronics Standards Association (VESA), located in Milpitas, Calif., the standards of which may also be found at http://www.vesa.org. Other hole and bracket configurations may also be utilized.

Figure 2:
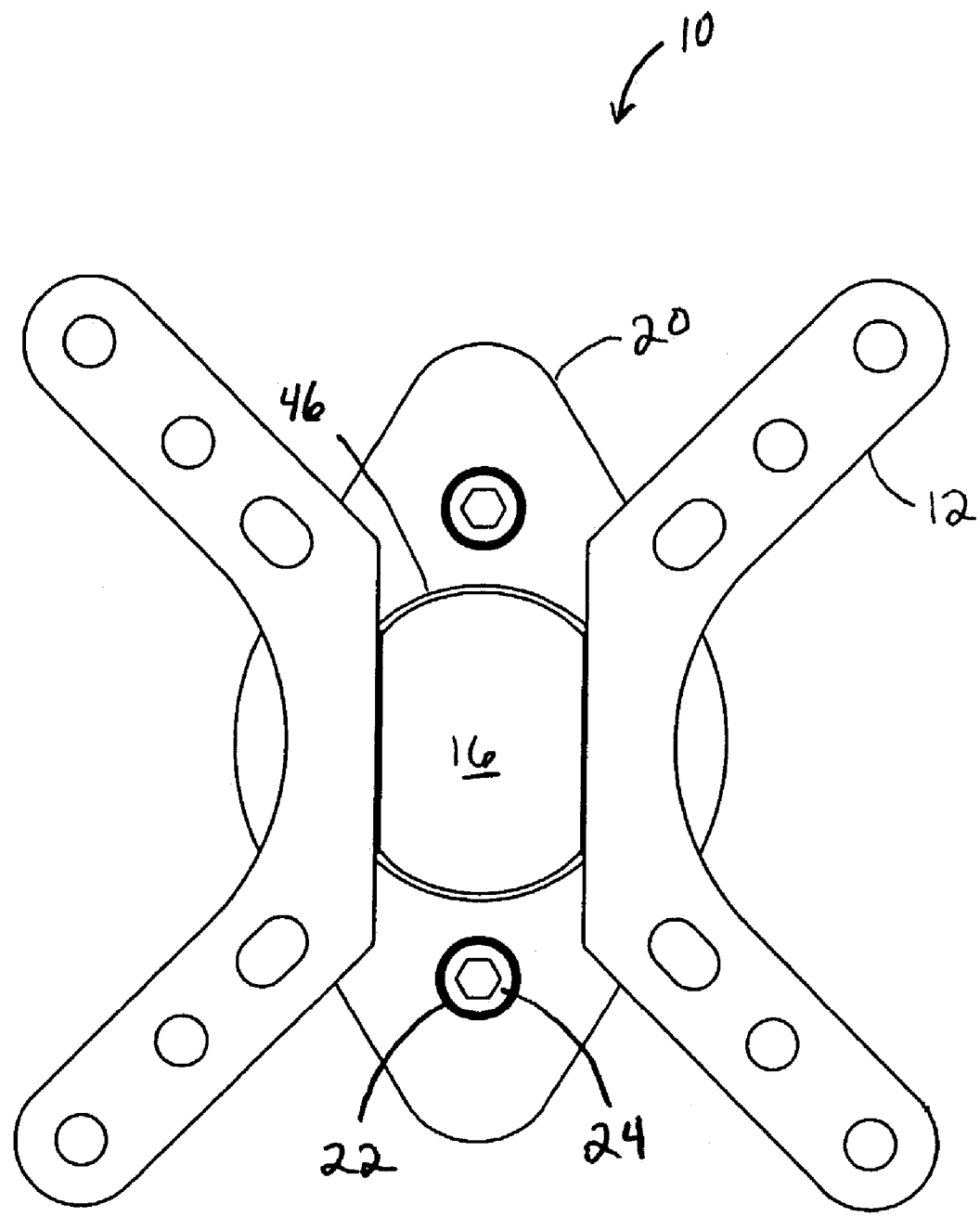
FIG. 2 illustrates a side plan view of the mounting system of FIG. 1.

Referring to FIGS. 1 and 2, the cover 20 includes an aperture 46 through which the body of the support arm 16 extends. The aperture 46 is appropriately sized to allow the end of the support arm 16 to extend therethrough when assembled while maintaining the position of the support arm 16 relative to the cover 20 and the mounting plate. The cover also includes bolt holes 22 through which bolts 24 are passed, respectively, for affixing the cover 20 to the mounting plate.

Figure 3:
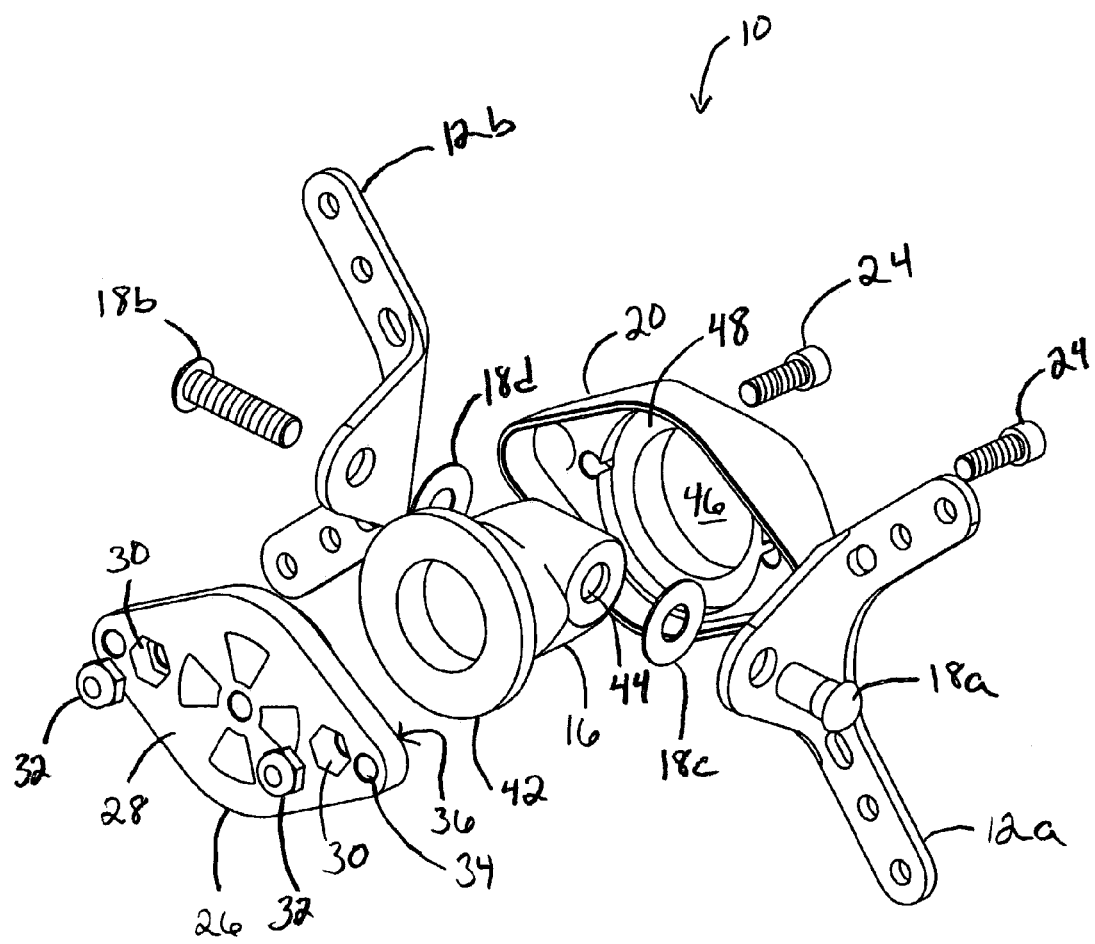
FIG. 3 illustrates an exploded perspective view of the mounting system of FIG. 1.

Referring to FIG. 3, the mounting plate 26 includes three linearly aligned mounting holes 34. Linear alignment of the mounting holes 34 facilitates alignment of the mounting plate on the supporting structure in a desired orientation. The mounting plate 26 also includes two through holes 30. On the back side 28 of the mounting plate 26, each through hole 30 is shaped to retain a nut 32. The nuts 32 are press-fit into the through holes 30 from the back side of the mounting plate 26, the nuts 32 and bolts 24 enabling the cover plate 20 to be secured to the mounting plate 26. Other methods of capturing and maintaining the relative positions of the nuts 32 may also be employed. Each nut 32 includes a nylon retainer (not shown) so that the cover plate bolts 24 may be secured to maintain a desired tightness.

Figure 4:
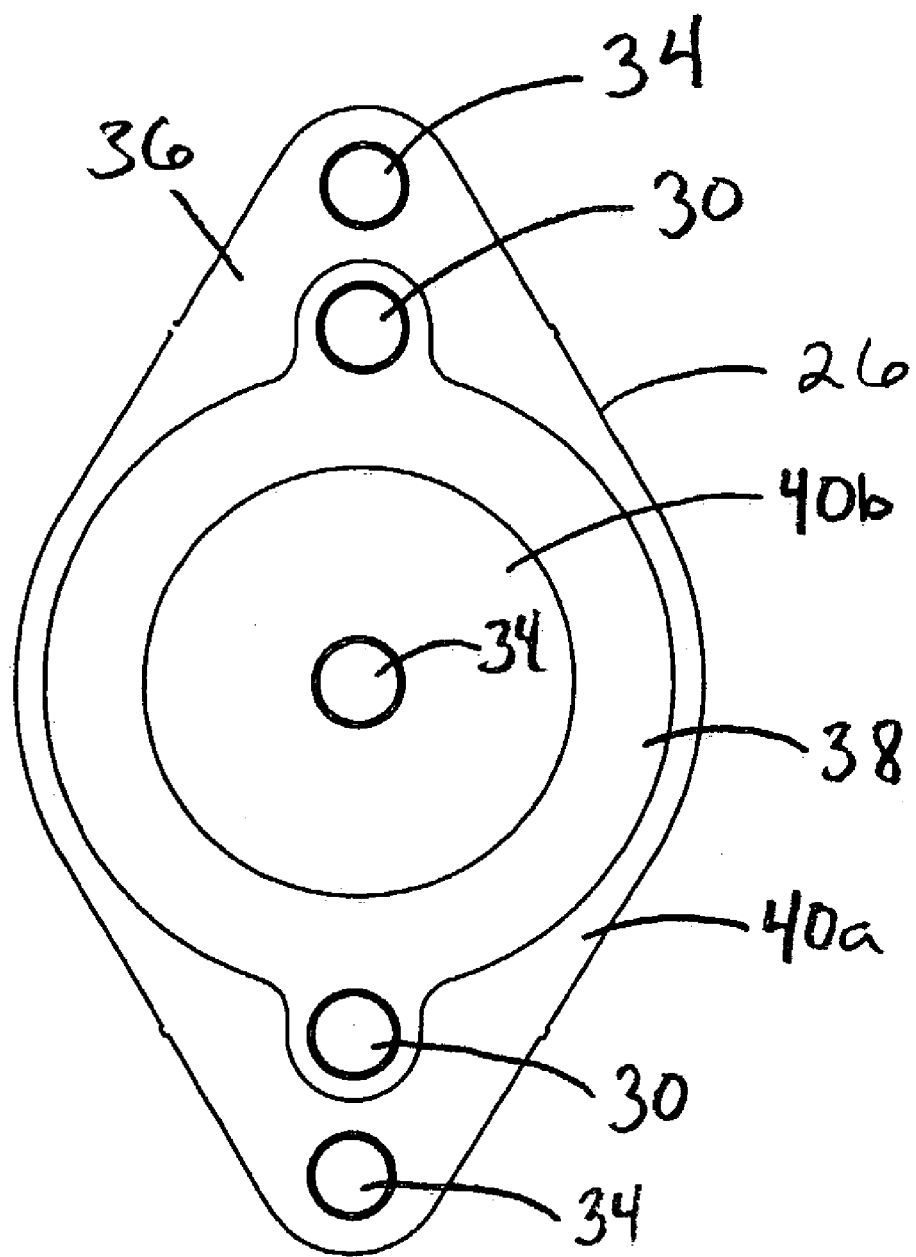
FIG. 4 illustrates a top plan view of a mounting plate.

The front side 36 of the mounting plate 26 is illustrated in FIG. 4. The front side 36 includes a first surface portion which is a radially defined and elevated shoulder 38. The second surface portion 40a, 40b is divided into two parts by the shoulder 38. Each of the mounting holes 34 passes through the second surface portion 40a, 40b. The two holes 30 that are employed to secure the cover plate 20 are linearly aligned with the mounting holes 34.

Returning to FIG. 3, the first end of the support arm 16 includes an outward extending radial flange 42. The diameter of the radial flange 42 is approximately equal to the outer diameter of the shoulder on the front side 36 of the mounting plate 26.

The second end of the support arm 16 includes a through hole 44 for receiving the axle pin assembly 18a-d and attaching the two halves of the display bracket 12a, 12b. The binder nut 18a and the screw 18b engage each other within the through hole 44. The bushings 18c, 18d are included between the two halves of the display bracket 12a, 12b, respectively, and the support arm 16 to prevent these parts from binding. The binder nut 18a prevents the screw 18b from actively engaging the support arm 16. The binder nut 18a also binds to the one half of the display bracket 12a so that the binder nut 18a and the screw 18b rotate in the same relative direction when the two halves of the display bracket 12a, 12b are rotated together, such as when a flat panel display is attached to the display bracket 12. The axle pin assembly 18a-d is thus able to retain its tension through repeated rotations of the display bracket 12. The tension may be set to prevent rotation under the load of a flat panel display, or alternatively little or no tension may be set to allow the display bracket 12 to rotate freely relative to the support arm 16.

The cover 20 includes an annular shoulder 48 about the aperture 46. When assembled, the radial flange 42 is disposed between the shoulder 38 of the mounting plate 26 and the annular shoulder 48 of the cover 20, with the second end of the support arm 16 extending through the aperture 46. With the radial flange 42 disposed between the two opposing surfaces, i.e., the shoulder 38 of the mounting plate 26 and the annular shoulder 48 of the cover 20, an adjustable axial pressure may be advantageously asserted on the radial flange 42 by the opposing surfaces. In the absence of any axial pressure on the radial flange 42, the support arm 16 is free to rotate. In the embodiment depicted in FIGS. 1-3, the support arm 16 is fully rotatable about an axis defined by the center of the radial flange 42, which also coincides with the center of the aperture 46. While full rotation of the support arm is preferred, alternative designs may limit the rotation of the support arm. Further, alternative designs need not define the axis of rotation with the radial flange. At the other extreme, the axial pressure on the radial flange 42 may be such that the support arm 16 is clamped in place and not capable of rotation. The axial pressure may be adjusted between the two extremes, such that rotation of the support arm 16 has a desired resistance.

Another advantage derived from the variable axial pressure on the radial flange 42 arises when the system 10 is mounted to a wall or other vertical surface. The mounting plate 26 may be affixed to the wall in any desired orientation. The cover 20 and the support arm 16 are attached to the mounting plate 26 as described above. Thusly assembled, the support arm is easily rotatable if little or no axial pressure is brought to bear on the radial flange 42. Rotation of the support arm when mounted on a vertical surface facilitates leveling the flat panel display held by the system 10. Once the flat panel display is appropriately leveled, the bolts 24 may be tightened to prevent further rotation of the support arm 16.

Figure 5:
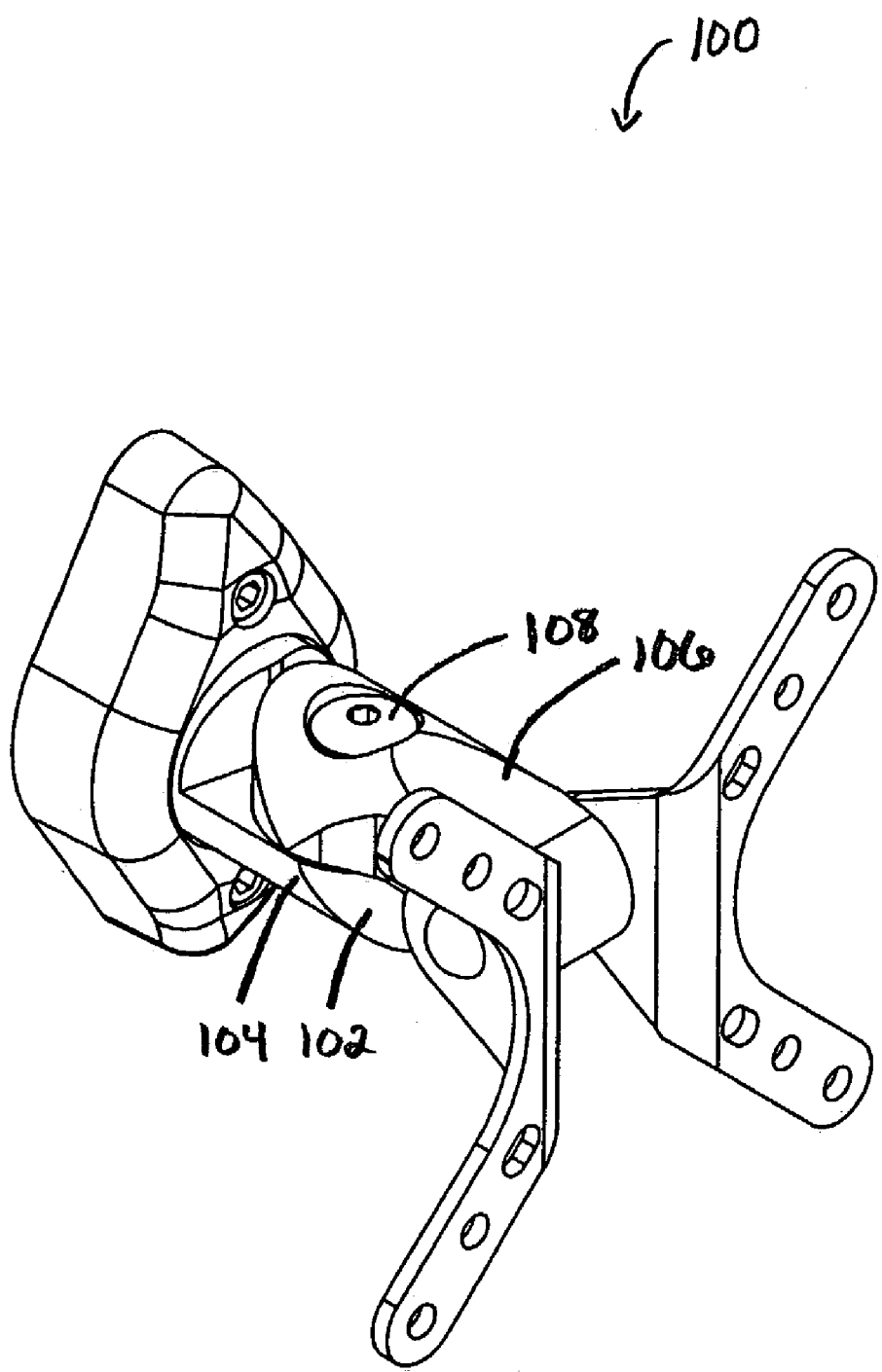
FIG. 5 illustrates a perspective view of a mounting system in accordance with a second embodiment of the present invention.
Figure 6:
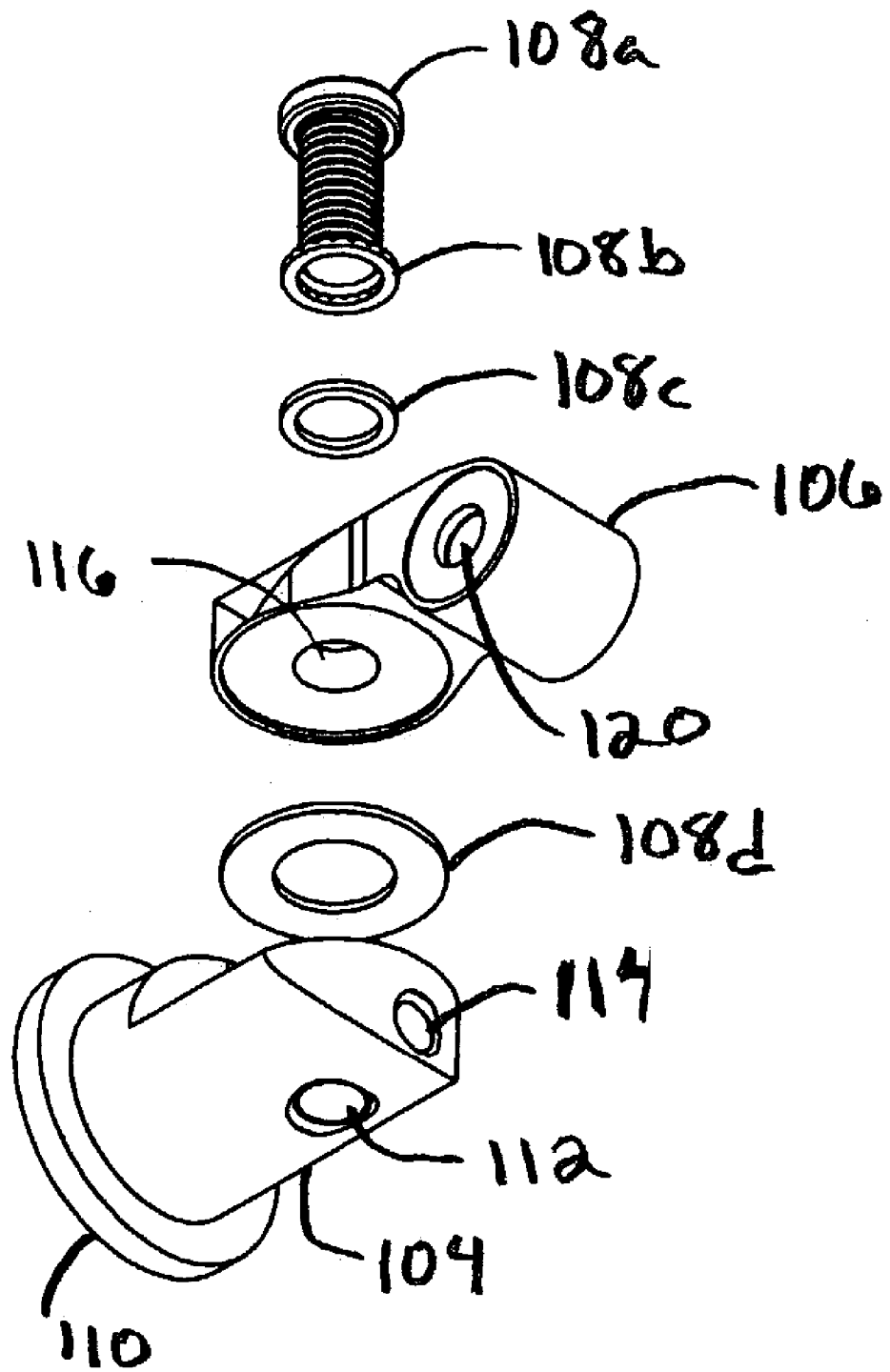
FIG. 6 illustrates an exploded perspective view the articulating arm of the system of FIG. 5.
Figure 7:
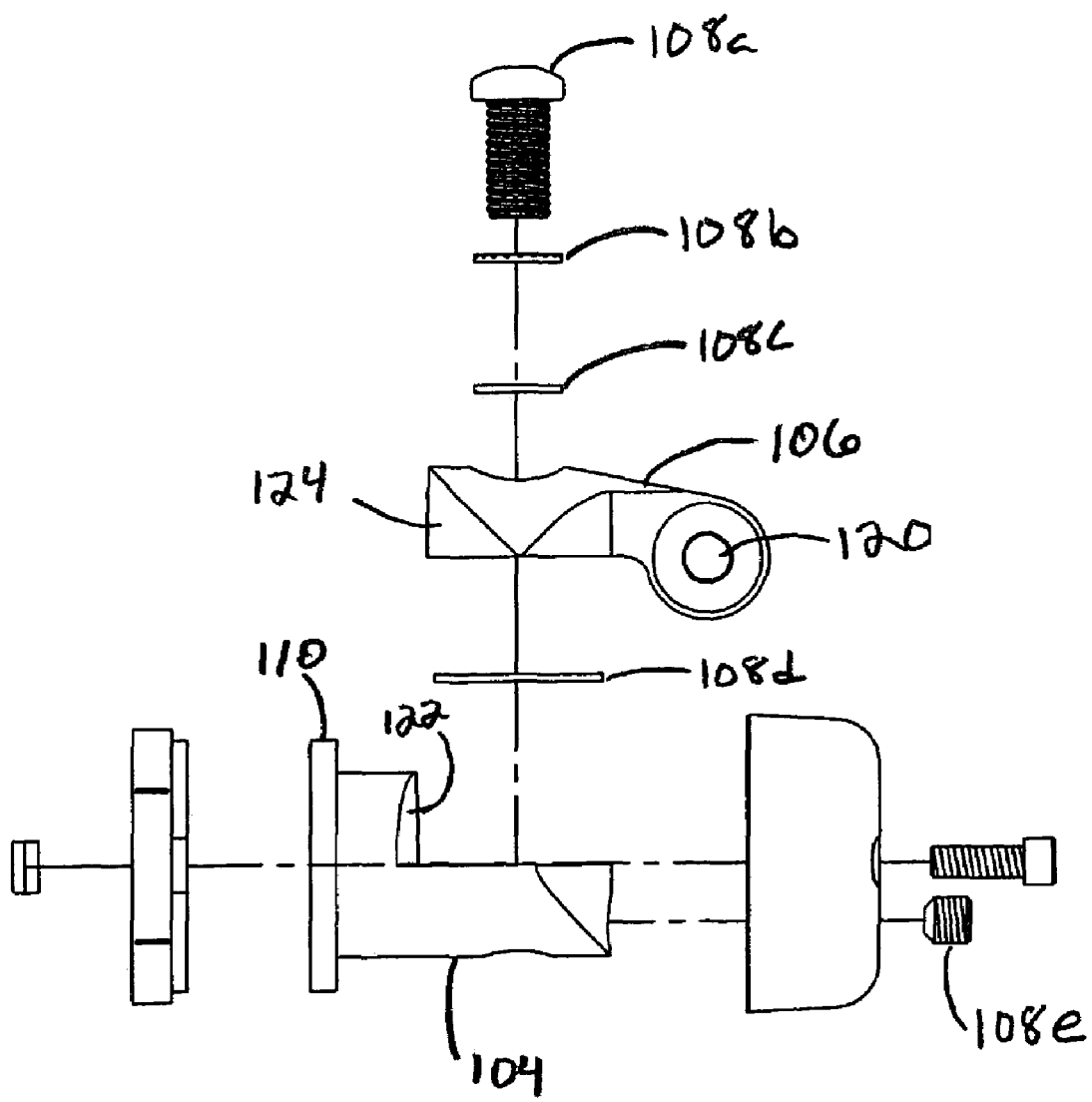
FIG. 7 illustrates an exploded side plan view of the articulating arm of FIG. 6.

The ability to rotate the support arm as previously described provides an even greater advantage when the support arm comprises an articulating arm. FIG. 5 illustrates a system 100 which includes an articulating arm. The articulating arm comprises a first arm segment 104 rotatably affixed to a second arm segment 106 at a joint 102, which includes a joint assembly 108. FIGS. 6 and 7 show exploded views of the articulating arm and joint assembly. The first arm segment 104 includes a radial flange 110 at one end and intersecting holes 112, 114 for the joint assembly 108a-e at the opposite end. The second arm segment 106 includes a through hole 120 and a hole 116 for the joint assembly. The hole 120 in the second arm segment 106 is for attaching the axle pin assembly (not shown) and the display bracket (not shown).

The joint screw 108a passes through the hole 116 in the second arm segment 106 and threadably engages the hole 112 in the first arm segment 104. The joint screw 108a thus forms the rotational axis for the joint assembly. Tension in the joint screw 108a is adjustable to provide a desired resistance to rotation between the first and second arm segments 104, 106. A locking Belleville washer 108b and a bushing 108c are disposed between the head of the joint screw 108a and the second arm segment 106 prevent these elements from binding. A bushing 108d between the two arm segments 104, 106 prevents the arm segments from binding. A set screw 108e is inserted into and threadably engages the hole 114. The two intersecting holes 112, 114 allow the set screw 108e, when inserted into the hole 114, to bear against the joint screw 108a. Adjustments to the set screw 108e may be made to lock the joint screw 108a in position after the desired level of tension has been set.

Figure 8:
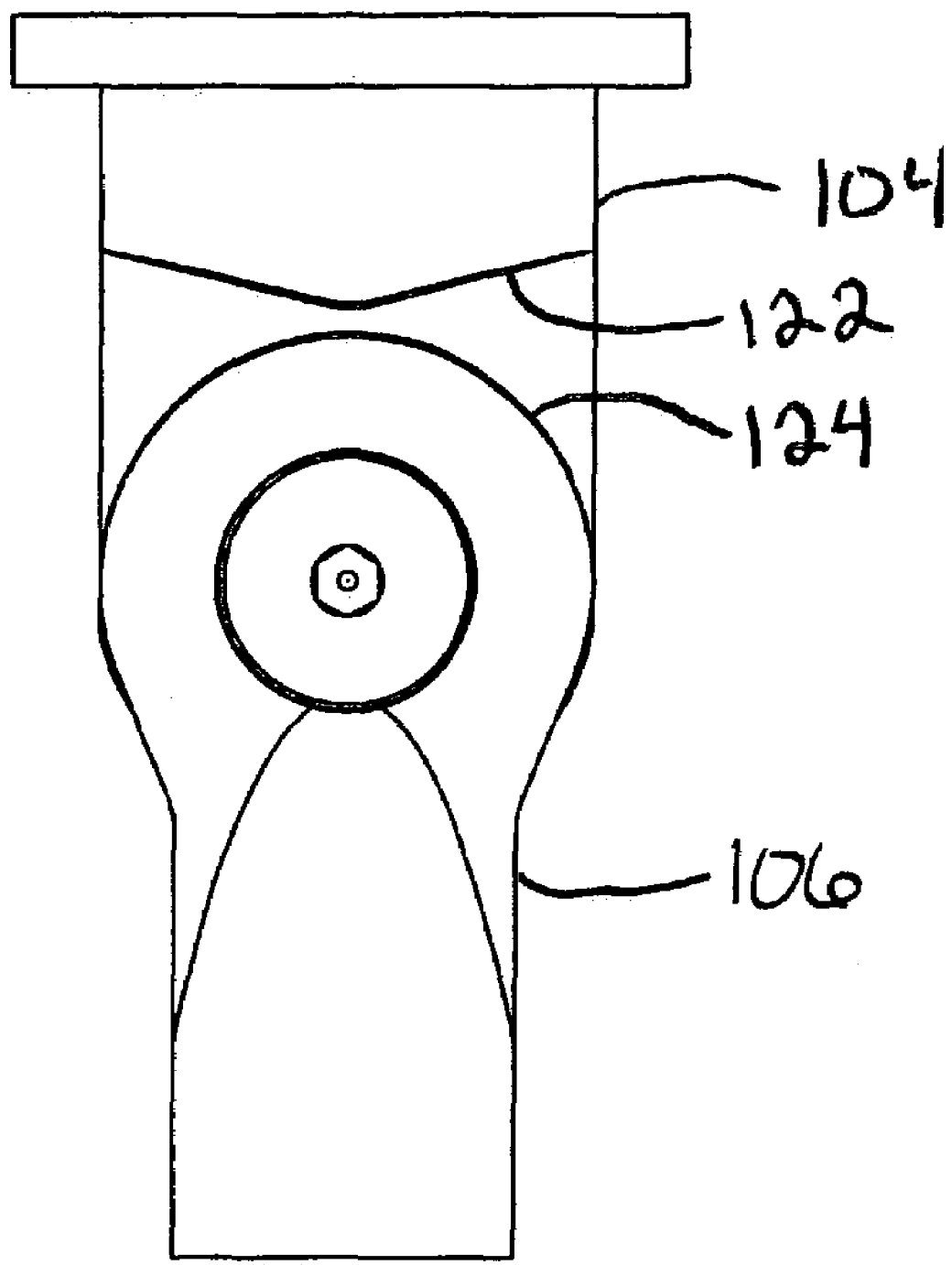
FIG. 8 illustrates a top plan view of the articulating arm of FIG. 6.

Relative to each other, the arm segments 104, 106 have a wide range of rotation. Referring to FIG. 7, the arm segments include opposing surfaces 122, 124, respectively, that are shaped to avoid interfering with rotation. Referring to FIG. 8, the surface 122 of the first arm segment 104 tapers away from the rounded surface 124 of the second arm segment 124, giving the arm segments 104, 106 sufficient clearance for more than 180° of rotation.

The ability to rotate the articulating arm relative to the mounting plate is particularly advantageous. An arm that articulates in a non-horizontal plane will tend to seek the position which places the load on the arm at the lowest possible point unless the joints are sufficiently tensioned to prevent the movement. With the present system, the articulating arm itself may be oriented to have purely vertical or purely horizontal articulation. The orientation of the mounting plate when mounted is therefore irrelevant. For an arm that articulates in a purely horizontal plane, the tension on the joints may be reduced or eliminated. Reduction of joint tension facilitates movement of the arm, especially under the load of an attached flat panel display. For an arm that articulates in a purely vertical plane, non-vertical stresses on the joints may be reduced or eliminated. Reduction of such stresses on the joints helps increase the overall life of the articulating arm.

Figure 9:
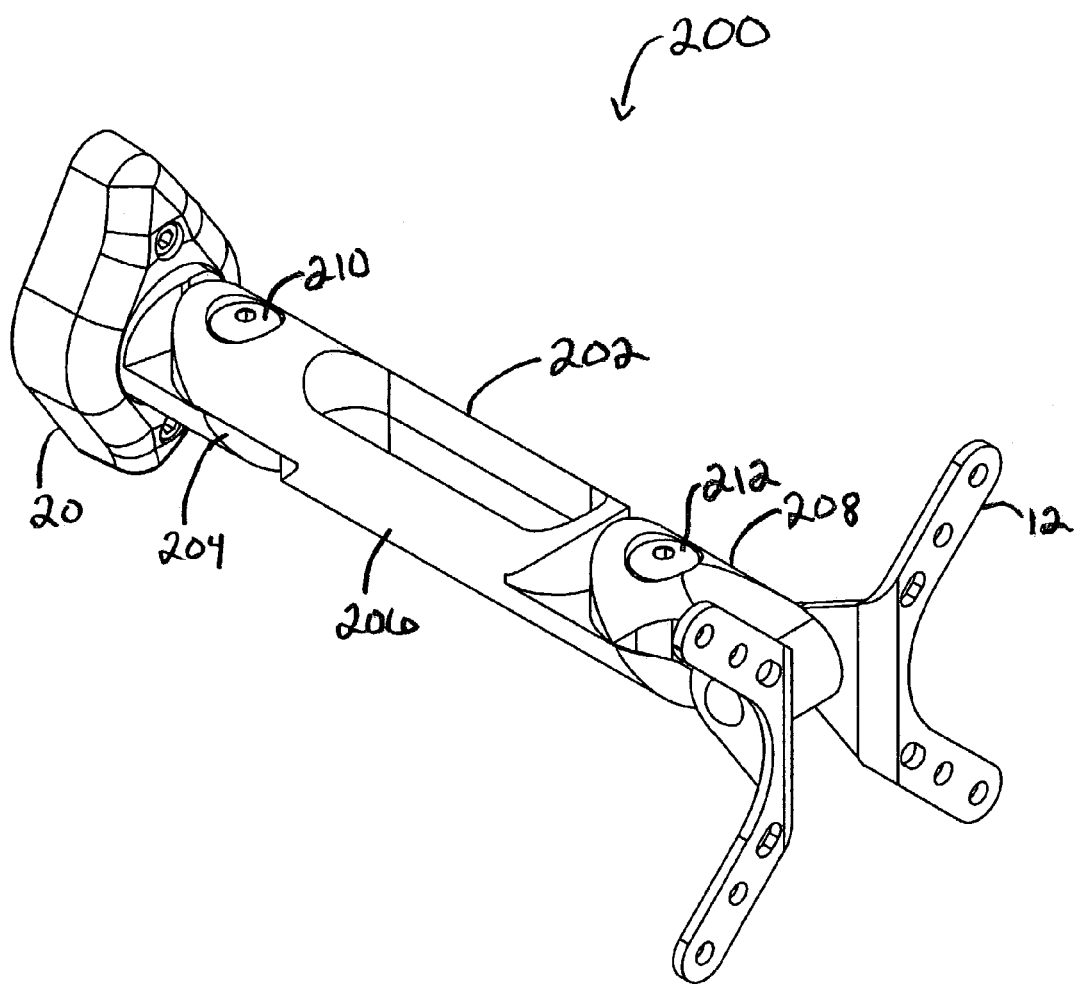
FIG. 9 illustrates a perspective view of a mounting system in accordance with a third embodiment of the present invention.

FIG. 9 illustrates a system 200 which includes an articulating arm 202 having three arm segments and two joints. The first arm segment 204 extends from the aperture in the cover 20 and is rotatably affixed to the middle arm segment 206 at a first joint 210. The middle arm segment 206 is in turn rotatably affixed to the third arm segment 208 at a second joint 212. Additional arm segments and joints may also be included. The joints and joint assemblies in the system 200 of FIG. 9 are like those previously described.

Figure 10:
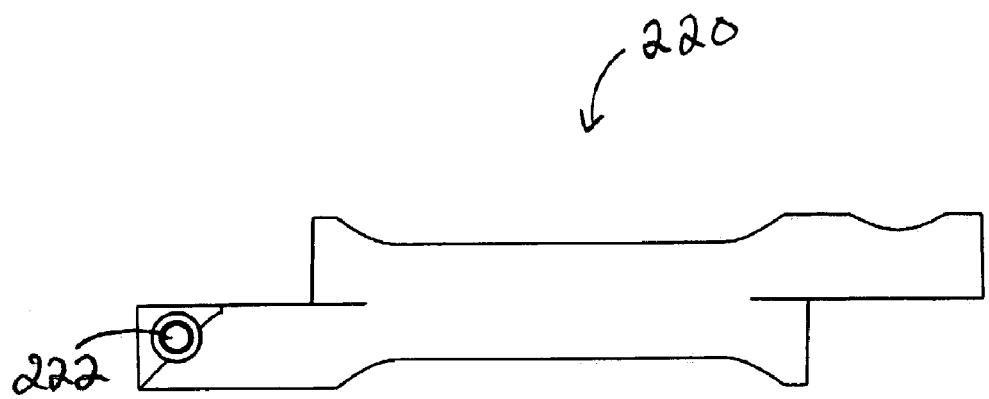
FIG. 10 illustrates a top plan view of a segment of the articulating arm in the system of FIG. 9.
Figure 11:
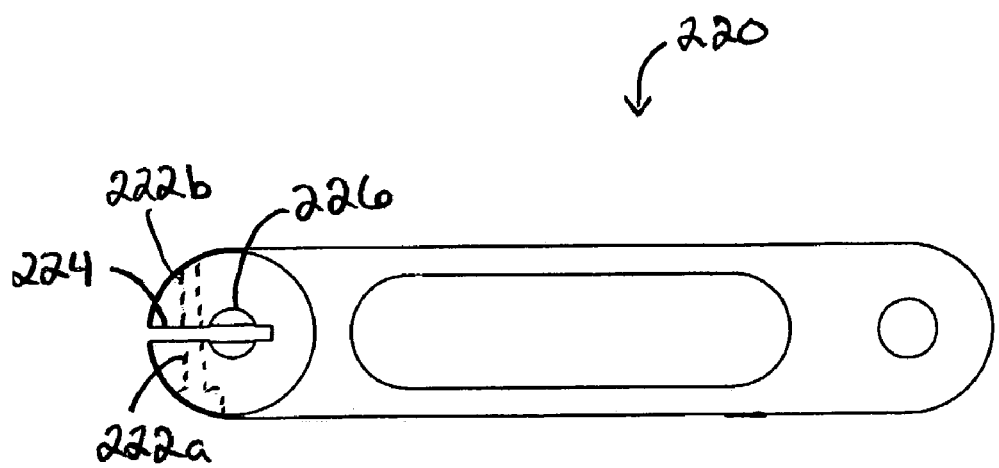
FIG. 11 illustrates a side plan view of a segment of the articulating arm in the system of FIG. 10.

FIGS. 10 and 11 illustrate a middle arm segment 220 having an alternative design for maintaining tension in the joint screw (not shown). This alternative design may be used at any joint of an articulating arm. The joint screw, after passing through another arm segment (not shown), is threadably secured to the middle arm segment 220 at the hole 226. A split 224 in the end of the arm segment 220 coincides with the hole 226. A screw hole 222 is formed between the end of the middle arm segment 220 and the joint screw hole 226. This second screw hole 222 is perpendicular to the joint screw hole 226. A screw passes through one side 222a of the screw hole, across the split 224, and threadably engages the second side 222b of the screw hole. In this manner, the end of the arm segment 220 may be clamped about the joint screw to maintain a desired tension in the joint screw.

Thus, a mounting system for a flat panel display is disclosed. While embodiments of this invention have been shown and described, it will be apparent to those skilled in the art that many more modifications are possible without departing from the inventive concepts herein. For example, although a particular type of articulating arm is described above, those skilled in the art will recognize that alternative forms of articulating arms may be easily substituted therefor. The invention, therefore, is not to be restricted except in the spirit of the following claims.

What is claimed is:

1. A mounting system comprising:
a mounting plate including a radially defined first surface portion and a second surface portion, the second surface portion including two or more mounting holes therethrough;
an articulating arm including an outward extending radial flange at a first end and at least one joint, the radial flange abutting the first surface portion of the mounting plate;
a cover including a central aperture, the cover being affixed to the mounting plate with the radial flange disposed therebetween, the mounting plate and the cover being adapted to exert axial pressure on the radial flange to prevent the articulating arm from unwanted rotation relative to the mounting plate and the cover, and with a second end of the articulating arm extending through the central aperture; and
a flat panel display bracket rotatably affixed to the second end of the articulating arm;
wherein the articulating arm further comprises a first arm segment rotatably affixed to a second arm segment at the at least one joint, the at least one joint being adapted to provide resistance to rotation between the first and second arm segments, the resistance to rotation being adjustable.

2. A mounting system comprising:
a mounting plate including a radially defined elevated shoulder and two or more mounting holes;
an articulating arm comprising a plurality of arm segments and at least one joint rotatably joining two of the plurality of arm segments, wherein a first of the arm segments includes an outward extending radial flange abutting the shoulder and the at least one joint is adapted to provide resistance to rotation between the two arm segments, the resistance to rotation being adjustable;
a cover including a central aperture, wherein the cover is affixed to the mounting plate with the radial flange disposed therebetween and with the first of the arm segments extending through the central aperture, the articulating arm being rotatable about a first axis defined by the radial flange, and wherein the mounting plate and the cover are adapted to exert axial pressure on the radial flange, the axial pressure being adjustable to maintain the articulating arm in a chosen orientation, relative to the mounting plate, under load;
a flat panel display bracket rotatably affixed to a second of the arm segments, the flat panel display bracket being adapted to maintain a chosen orientation, relative to the support arm, under load.

3. A mounting system comprising:
a plate including a radially defined first surface portion and means for mounting the plate to a supporting structure;
a support arm including an outward extending radial flange at a first end, the radial flange abutting the first surface portion of the plate;
a cover including a central aperture, the cover being affixed to the plate with the radial flange disposed therebetween and with a second end of the support arm extending through the central aperture, wherein the cover and the plate include means for exerting axial pressure on the radial flange to prevent the support arm from unwanted rotation relative to the plate and the cover, the means for exerting pressure being adjustable; and
a flat panel display bracket rotatably affixed to the second end of the support arm, the flat panel display bracket including means for maintaining a chosen orientation, relative to the support arm, under load;
wherein the support arm further comprises an articulating arm, the articulating arm including a plurality of arm segments and at least one joint rotatably joining two of the plurality of arm segments.

4. The mounting system of claim 3, wherein the at least one joint comprises means for providing adjustable resistance to rotation between the two arm segments.

* * * * *